United States Patent
Wiegman (10) Patent No.: US 11,967,673 B2
(45) Date of Patent: Apr. 23, 2024

(54) METHODS FOR MANUFACTURING A BATTERY PACK OF AN ELECTRIC AIRCRAFT

(71) Applicant: BETA AIR, LLC, South Burlington, VT (US)

(72) Inventor: Herman Wiegman, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/525,513

(22) Filed: Nov. 12, 2021

(65) Prior Publication Data

US 2023/0155162 A1 May 18, 2023

(51) Int. Cl.
| | | |
|---|---|---|
| *H01M 10/04* | (2006.01) | |
| *B64D 27/24* | (2006.01) | |
| *H01M 50/207* | (2021.01) | |
| *H01M 50/211* | (2021.01) | |
| *H01M 50/249* | (2021.01) | |

(Continued)

(52) U.S. Cl.
CPC ........ *H01M 10/0468* (2013.01); *B64D 27/24* (2013.01); *H01M 10/0413* (2013.01); *H01M 10/0422* (2013.01); *H01M 10/0481* (2013.01); *H01M 50/207* (2021.01); *H01M 50/211* (2021.01); *H01M 50/249* (2021.01); *H01M 50/271* (2021.01); *H01M 50/289* (2021.01); *H01M 2220/20* (2013.01)

(58) Field of Classification Search
CPC ......... H01M 10/0468; H01M 10/0413; H01M 10/0422; H01M 10/0404; H01M 10/0481; H01M 10/049; H01M 6/42; H01M 2220/20; H01M 50/209; H01M 50/249; H01M 50/264; B30B 7/04; Y02E 60/10; Y02P 70/50; B64D 27/24
See application file for complete search history.

(56) References Cited

U.S. PATENT DOCUMENTS

| | | | |
|---|---|---|---|
| 4,778,479 A | 10/1988 | Romling | |
| 5,407,450 A | 4/1995 | Rose | |
| 6,190,797 B1 | 2/2001 | Miyagi | |

(Continued)

FOREIGN PATENT DOCUMENTS

| | | |
|---|---|---|
| JP | 2005190748 A | 7/2005 |
| WO | 8802930 A1 | 4/1988 |

*Primary Examiner* — Lingwen R Zeng
(74) *Attorney, Agent, or Firm* — Brake Hughes Bellermann LLP (57) ABSTRACT

A method for the manufacturing of battery packs includes vertically stacking a plurality of battery cells to create a stack of battery cells, applying a compressive force on the stack of battery cells using a plurality of pneumatic cylinders, inserting a first portion of the compressed stack of battery cells into a container prior to releasing any of the plurality of pneumatic cylinders, engaging each of the battery cells of the plurality of battery cells with an end cap of the container, wherein the end cap is configured to maintain a predetermined arrangement of the plurality of battery cells, and releasing the first portion of the stack of battery cells from a first portion of the plurality of pneumatic cylinders while a second portion of the stack of battery cells remains compressed a second portion of the plurality of pneumatic cylinders.

16 Claims, 5 Drawing Sheets

(51) Int. Cl.
 *H01M 50/271* (2021.01)
 *H01M 50/289* (2021.01)

(56) References Cited

U.S. PATENT DOCUMENTS

| | | | |
|---|---|---|---|
| 6,303,248 B1* | 10/2001 | Peterson | H01M 50/213 |
| | | | 429/177 |
| 10,573,920 B2 | 2/2020 | Melack | |
| 2003/0031920 A1* | 2/2003 | Hoffman | H01M 50/262 |
| | | | 429/161 |
| 2004/0127952 A1 | 7/2004 | O'Phelan | |
| 2005/0147874 A1* | 7/2005 | Andersen | H01M 50/296 |
| | | | 429/86 |
| 2012/0301769 A1* | 11/2012 | Okada | H01M 10/625 |
| | | | 429/120 |
| 2014/0023893 A1* | 1/2014 | Shimizu | H01M 10/0481 |
| | | | 429/156 |
| 2014/0087231 A1 | 3/2014 | Schaefer | |
| 2018/0048036 A1* | 2/2018 | Melack | H01M 10/6554 |
| 2018/0083306 A1* | 3/2018 | Melack | B30B 7/04 |
| 2019/0393570 A1* | 12/2019 | Melack | H01M 10/617 |

\* cited by examiner

METHODS FOR MANUFACTURING A BATTERY PACK OF AN ELECTRIC AIRCRAFT

FIELD OF THE INVENTION

The present invention generally relates to the field of electric aircrafts. In particular, the present invention is directed to a method for manufacturing a battery pack of an electric aircraft.

BACKGROUND

Adequate battery assembly is integral to producing safe, high quality battery packs. Placing a plurality of pouch cells into a battery case while maintaining compression on the cells may be required during battery assembly. A method that is automated may improve upon the assembly process. Additional design features which reduce friction between the plurality of pouch cells and the battery case may improve upon the assembly process. Lack of a safe and high-quality assembly battery packs could result in catastrophic damage to the aircraft and its workers.

SUMMARY OF THE DISCLOSURE

In an aspect, a method for the manufacturing of battery packs for an electric aircraft is illustrated. The method includes vertically stacking a plurality of battery cells to create a stack of battery cells, applying a compressive force on the stack of battery cells using a plurality of pneumatic cylinders, inserting a first portion of the compressed stack of battery cells into a container prior to releasing any of the plurality of pneumatic cylinders, engaging each of the battery cells of the plurality of battery cells with an end cap of the container, wherein the end cap is configured to maintain a predetermined arrangement of the plurality of battery cells, and releasing the first portion of the stack of battery cells from a first portion of the plurality of pneumatic cylinders while a second portion of the stack of battery cells remains compressed a second portion of the plurality of pneumatic cylinders.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to manufacturing of a battery pack. In an embodiment, this disclosure includes an aircraft configured to include a plurality of battery cells inserted into a container. Aspects of the present disclosure include a container for the battery pack which is connected to the aircraft to supply power. Exemplary embodiments illustrating aspects of the present disclosure are described below in the context of several specific examples.

Figure 1:
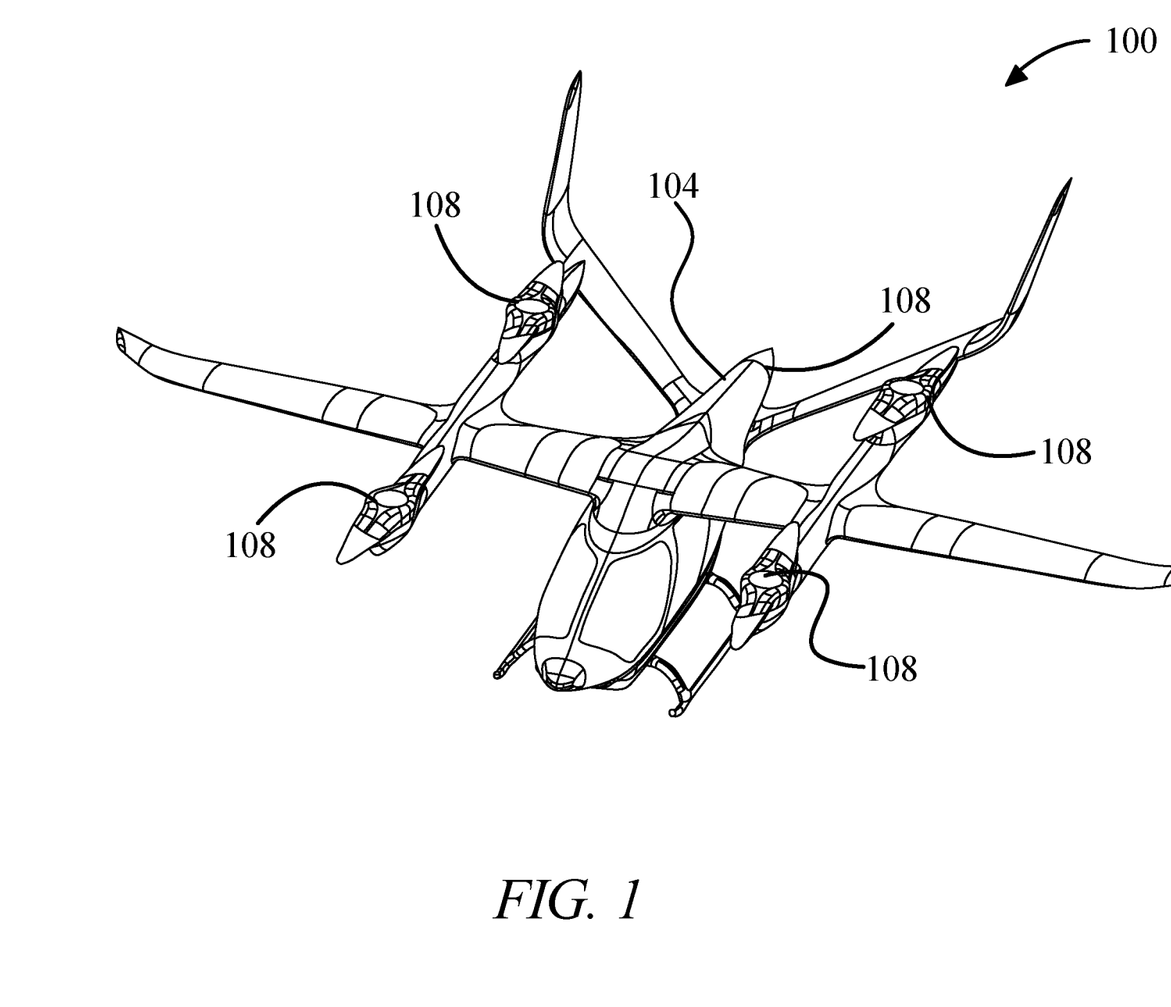
FIG. 1 is a diagrammatic representation of an exemplary embodiment of an electric aircraft.

Referring now to FIG. 1, an exemplary embodiment of an aircraft 100 is illustrated. In an embodiment, aircraft 100 is an electric aircraft. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gend capers, paramotors, and the like. Aircraft 100 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate a plane to a flight speed on takeoff and decelerate a plane after landing. In an embodiment, and without limitation, electric aircraft may be configured with an electric propulsion assembly. Electric propulsion assembly may include any electric propulsion assembly as described in U.S. Nonprovisional application Ser. No. 16/603,225, filed on Dec. 4, 2019, and entitled "AN INTEGRATED ELECTRIC PROPULSION ASSEMBLY," the entirety of which is incorporated herein by reference.

Still referring to FIG. 1, aircraft 100, may include a fuselage 104, a flight component 108 (or one or more flight components 108), computing device 112, and a sensor 116. Both the computing device 112 and sensor 116 are described further herein with reference to FIG. 2.

As used in this disclosure, a vertical take-off and landing (VTOL) aircraft is an aircraft that can hover, take off, and land vertically. An eVTOL, as used in this disclosure, is an electrically powered aircraft typically using an energy source, or a plurality of energy sources to power aircraft. To optimize the power and energy necessary to propel aircraft 100, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad-copter," multi-rotor helicopter, or other vehicle that maintains its lift primarily using downward thrusting propulsors. "Fixed-wing flight", as described herein, is where the aircraft is capable of flight using wings and/or foils that generate lift caused by the aircraft's forward airspeed and the shape of the wings and/or foils, such as airplane-style flight.

Still referring to FIG. 1, as used in this disclosure a "fuselage" is a main body of an aircraft, or in other words, the entirety of the aircraft except for a cockpit, nose, wings, empennage, nacelles, any and all control surfaces, and generally contains an aircraft's payload. Fuselage 104 may include structural elements that physically support a shape and structure of an aircraft. Structural elements may take a plurality of forms, alone or in combination with other types. Structural elements may vary depending on a construction type of aircraft such as without limitation a fuselage 104. Fuselage 104 may include a truss structure. A truss structure may be used with a lightweight aircraft and includes welded steel tube trusses. A "truss," as used in this disclosure, is an assembly of beams that create a rigid structure, often in combinations of triangles to create three-dimensional shapes. A truss structure may alternatively include wood construction in place of steel tubes, or a combination thereof. In embodiments, structural elements may include steel tubes and/or wood beams. In an embodiment, and without limitation, structural elements may include an aircraft skin. Aircraft skin may be layered over the body shape constructed by trusses. Aircraft skin may include a plurality of materials such as plywood sheets, aluminum, fiberglass, and/or carbon fiber, the latter of which will be addressed in greater detail later herein.

In embodiments, and with continued reference to FIG. 1, aircraft fuselage 104 may include and/or be constructed using geodesic construction. Geodesic structural elements may include stringers wound about formers (which may be alternatively called station frames) in opposing spiral directions. A "stringer," as used in this disclosure, is a general structural element that may include a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 104 orthogonal to a longitudinal (nose to tail) axis of the aircraft and may form a general shape of fuselage 104. A former may include differing cross-sectional shapes at differing locations along fuselage 104, as the former is the structural element that informs the overall shape of a fuselage 104 curvature. In embodiments, aircraft skin may be anchored to formers and strings such that the outer mold line of a volume encapsulated by formers and stringers includes the same shape as aircraft 100 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be attached to underlying stringers and formers and may interact with a fluid, such as air, to generate lift and perform maneuvers.

In an embodiment, and still referring to FIG. 1, fuselage 104 may include and/or be constructed using monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance from underlying skeleton-like elements. Monocoque fuselage may include aircraft skin made from plywood layered in varying grain directions, epoxy-impregnated fiberglass, carbon fiber, or any combination thereof.

According to embodiments, and further referring to FIG. 1, fuselage 104 may include a semi-monocoque construction. Semi-monocoque construction, as used herein, is a partial monocoque construction, wherein a monocoque construction is described above in detail. In semi-monocoque construction, aircraft fuselage 104 may derive some structural support from stressed aircraft skin and some structural support from underlying frame structure made of structural elements. Formers or station frames can be seen running transverse to the long axis of fuselage 104 with circular cutouts which are generally used in real-world manufacturing for weight savings and for the routing of electrical harnesses and other modern on-board systems. In a semi-monocoque construction, stringers are thin, long strips of material that run parallel to a long axis of a fuselage. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction", vehicles are characterized by a construction in which the body, floor plan, and chassis form a single structure. In the aircraft world, unibody may be characterized by internal structural elements like formers and stringers being constructed in one piece, integral to the aircraft skin as well as any floor construction like a deck.

Still referring to FIG. 1, stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may include aluminum, aluminum alloys, graphite epoxy composite, steel alloys, titanium, or an undisclosed material alone or in combination.

In an embodiment, and still referring to FIG. 1, stressed skin, when used in semi-monocoque construction is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of fuselage 104. Monocoque includes only structural skin, and in that sense, aircraft skin undergoes stress by applied aerodynamic fluids imparted by the fluid. Stress as used in continuum mechanics may be described in pound-force per square inch ($lbf/in^2$) or Pascals (Pa). In semi-monocoque construction stressed skin may bear part of aerodynamic loads and additionally may impart force on an underlying structure of stringers and formers.

Still referring to FIG. 1, it should be noted that an illustrative embodiment is presented only, and this disclosure in no way limits the form or construction method of a system and method for loading payload into an eVTOL aircraft. In embodiments, fuselage 104 may be configurable based on the needs of the eVTOL per specific mission or objective. The general arrangement of components, structural elements, and hardware associated with storing and/or moving a payload may be added or removed from the fuselage 104 as needed, whether it is stowed manually, automatedly, or removed by personnel altogether. Fuselage 104 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 104 may also be configurable to accept certain specific cargo containers, or a receptacle that can, in turn, accept certain cargo containers.

Still referring to FIG. 1, aircraft 100 may include a plurality of laterally extending elements attached to fuselage 104. As used in this disclosure a "laterally extending element" is an element that projects essentially horizontally from the fuselage, including an outrigger, a spar, and/or a fixed wing that extends from the fuselage. Wings may be structures which may include airfoils configured to create a pressure differential resulting in lift. Wings may generally dispose on the left and right sides of the aircraft symmetrically, at a point between nose and empennage. Wings may include a plurality of geometries in planform view, swept swing, tapered, variable wing, triangular, oblong, elliptical, square, among others. A wing's cross section geometry may include an airfoil. An "airfoil" as used in this disclosure is a shape specifically designed such that a fluid flowing above and below it exerts differing levels of pressure against the top and bottom surface. In embodiments, the bottom surface of an aircraft can be configured to generate a greater pressure than does the top, resulting in lift. A laterally extending element may include differing and/or similar cross-sectional geometries over its cord length or the length from wing tip to where wing meets aircraft's body. One or more wings may be symmetrical about a longitudinal plane of an aircraft, which includes the longitudinal or roll axis reaching down the center of the aircraft through the nose and empennage, and plane's yaw axis. Laterally extending elements may include a control surface configured to be commanded by a pilot or pilots to change a wing's geometry and therefore its interaction with a fluid medium, like air. Control surfaces may include flaps, ailerons, tabs, spoilers, and slats, among others. A control surface may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may include a combination of control surfaces to perform maneuvers while flying or on ground.

Still referring to FIG. 1, aircraft 100 may include a plurality of flight components 108. As used in this disclosure a "flight component" is a component that promotes flight and guidance of an aircraft. In an embodiment, flight component 108 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling may include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 1, plurality of flight components 108 may include at least a lift propulsor. As used in this disclosure a "propulsor" is a component and/or device used to propel a craft upward by exerting force on a fluid medium, which may include a gaseous medium such as air or a liquid medium such as water. Propulsor may include any device or component that consumes electrical power on demand to propel an electric aircraft in a direction or other vehicle while on ground or in-flight. For example, and without limitation, propulsor may include a rotor, propeller, paddle wheel and the like thereof. In an embodiment, propulsor may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment propulsor may include a rotating power-driven hub, to which are attached several radial airfoil-section blades such that the whole assembly rotates about a longitudinal axis. The lift propulsor is further described herein with reference to FIG. 2.

In an embodiment, and still referring to FIG. 1, plurality of flight components 108 may include one or more power sources. As used in this disclosure a "power source" is a source that that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. In an embodiment, power source may include an inverter. As used in this disclosure an "inverter" is a device that changes one or more currents of a system. For example, and without limitation, inverter may include one or more electronic devices that change direct current to alternating current. As a further non-limiting example, inverter may include receiving a first input voltage and outputting a second voltage, wherein the second voltage is different from the first voltage. In an embodiment, and without limitation, inverter may output a waveform, wherein a waveform may include a square wave, sine wave, modified sine wave, near sine wave, and the like thereof.

Still referring to FIG. 1, power source may include an energy source. An energy source may include, for example, a generator, a photovoltaic device, a fuel cell such as a hydrogen fuel cell, direct methanol fuel cell, and/or soend cap oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which aircraft 100 may be incorporated.

In an embodiment, and still referring to FIG. 1, an energy source may be used to provide a steady supply of electrical power to a load over the course of a flight by a vehicle or other electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may be capable of providing sufficient electrical power for auxiliary loads including without limitation, lighting, navigation, communications, de-icing, steering or other systems requiring power or energy. Further, the energy source may be capable of providing sufficient power for controlled descent and landing protocols, including, without limitation, hovering descent or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 1, an energy source may include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. In an embodiment where the energy source includes a plurality of battery cells, the overall power output capacity may be dependent on the electrical parameters of each individual cell. If one cell experiences high self-discharge during demand, power drawn from at least an energy source may be decreased to avoid damage to the weakest cell. The energy source may further include, without limitation, wiring, conduit, housing, cooling system and battery management system. Persons skilled in the art will be aware, after reviewing the entirety of this disclosure, of many different components of an energy source.

Still referring to FIG. 1, plurality of flight components 108 may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Additionally, or alternatively, pusher flight component may include a plurality of pusher flight components. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1145 N to force aircraft to in a horizontal direction along the longitudinal axis. As a further non-limiting example, pusher component may twist and/or rotate to pull air behind it and, at the same time, push aircraft 100 forward with an equal amount of force. In an embodiment, and without limitation, the more air forced behind aircraft, the greater the thrust force with which aircraft 100 is pushed horizontally will be. In another embodiment, and without limitation, forward thrust may force aircraft 100 through the medium of relative air. Additionally or alternatively, plurality of flight components 108 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Figure 2A:
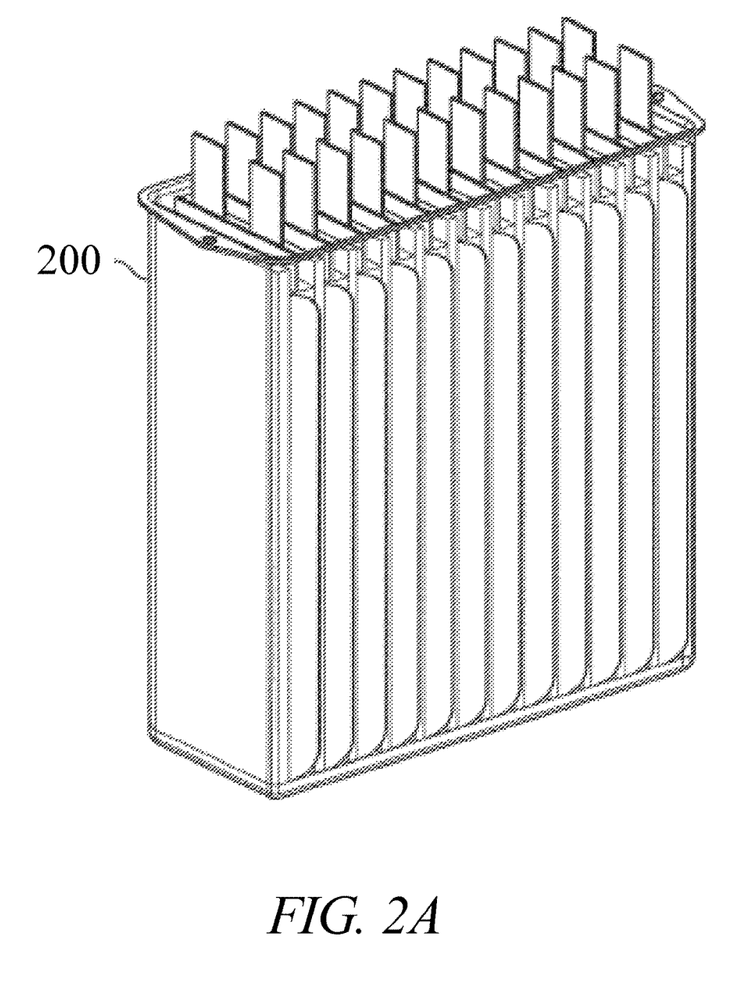
FIG. 2A is an exemplary embodiment of a battery pack of an electric aircraft from a side view.

Now referring to FIG. 2A, system 200 exemplifies an embodiment of a battery pack in a container of an electric aircraft from a side view. In this disclosure, a "battery pack" is a power source that is configured to store electrical energy in the form of a plurality of battery modules, which themselves are comprised of a plurality of electrochemical cells. These cells may utilize electrochemical cells, galvanic cells, electrolytic cells, fuel cells, flow cells, and/or voltaic cells. In general, an electrochemical cell is a device capable of generating electrical energy from chemical reactions or using electrical energy to cause chemical reactions, this disclosure will focus on the former. Voltaic or galvanic cells are electrochemical cells that generate electric current from chemical reactions, while electrolytic cells generate chemical reactions via electrolysis. In general, the term 'battery' is used as a collection of cells connected in series or parallel to each other. A battery cell may, when used in conjunction with other cells, may be electrically connected in series, in parallel or a combination of series and parallel. Series connection comprises wiring a first terminal of a first cell to a second terminal of a second cell and further configured to comprise a single conductive path for electricity to flow while maintaining the same current (measured in Amperes) through any component in the circuit. A battery cell may use the term 'wired', but one of ordinary skill in the art would appreciate that this term is synonymous with 'electrically connected', and that there are many ways to couple electrical elements like battery cells together. An example of a connector that do not comprise wires may be prefabricated terminals of a first gender that mate with a second terminal with a second gender. Battery cells may be wired in parallel. Parallel connection comprises wiring a first and second terminal of a first battery cell to a first and second terminal of a second battery cell and further configured to comprise more than one conductive path for electricity to flow while maintaining the same voltage (measured in Volts) across any component in the circuit. Battery cells may be wired in a series-parallel circuit which combines characteristics of the constituent circuit types to this combination circuit. Battery cells may be electrically connected in a virtually unlimited arrangement which may confer onto the system the electrical advantages associated with that arrangement such as high-voltage applications, high-current applications, or the like. In an exemplary embodiment, battery pack comprise 196 battery cells in series and 18 battery cells in parallel. This is, as someone of ordinary skill in the art would appreciate, is only an example and battery pack may be configured to have a near limitless arrangement of battery cell configurations.

Still referring to FIG. 2A, battery pack may also comprise a side wall which comprises a laminate of a plurality of layers configured to thermally insulate the plurality of battery cells from external components of battery pack. Side wall layers may comprise materials which possess characteristics suitable for thermal insulation as described in the entirety of this disclosure like fiberglass, air, iron fibers, polystyrene foam, and thin plastic films, to name a few. Side wall may additionally or alternatively electrically insulate the plurality of battery cells from external components of battery pack and the layers of which may comprise polyvinyl chloride (PVC), glass, asbestos, rigid laminate, varnish, resin, paper, Teflon, rubber, and mechanical lamina. Center sheet may be mechanically coupled to side wall in any manner described in the entirety of this disclosure or otherwise undisclosed methods, alone or in combination. Side wall may comprise a feature for alignment and coupling to center sheet. This feature may comprise a cutout, slots, holes, bosses, ridges, channels, and/or other undisclosed mechanical features, alone or in combination.

Referring still to FIG. 2A, the battery pack assembly system 200 may be used to assemble various types of batteries. Battery pack assembly 200 illustrates an embodiment of a battery assembled by the system described herein. The battery pack as shown comprises stacked components enclosed in a sealed container assembly. The container may be used as a heat sink and may comprise aluminum or any other appropriate material. In this embodiment, the term "container" refers to a case designed to hold or protect something; in this case, the container is holding and protecting the plurality of battery cells, which is described further herein with reference to FIG. 3. Container is rectangular and comprises an electrical contact having an electrical connection with each battery cell of the plurality of battery cells.

In some cases, container may be made from metal for example one or more of sheet metal, stamped metal, extruded metal, and/or machined metal. In some cases, container may be formed by way of welding, brazing, and/or soldering. In some cases, container may be composed wholly or in part of a relatively light and strong metal, such as without limitation aluminum alloy. Container may include an exterior surface and interior surface that are curated from different materials. In some versions, container may provide a firewall between flammable battery modules within the battery and an environment or vehicle surrounding the battery. The container may be sealed to the battery pack structure. The container may comprise an opening wherein the battery cells are inserted. In some embodiments, an end cap is places over an opening after the battery cells are inserted to create a fully sealed battery.

Figure 2B:
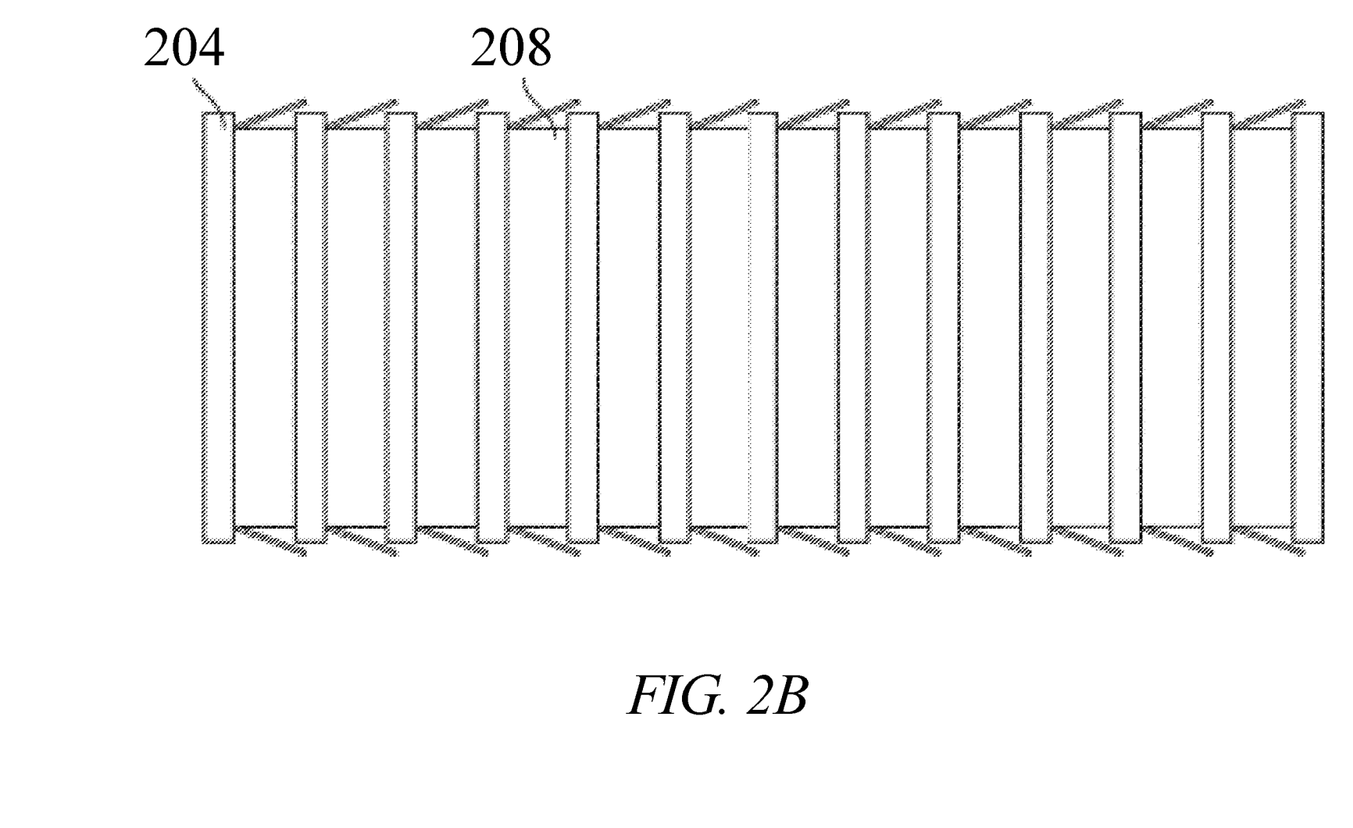
FIG. 2B is an exemplary embodiment of a battery pack of an electric aircraft from a top view.

Now referring to FIG. 2B, system 200 exemplifies an embodiment of a battery pack in a container of an electric aircraft from a top view. A battery cell stack may comprise non-cell layers. Thermal insulation, conductors, and cells may be stacked in the can. Layers of cells may be placed in between layers of insulation.

Still referring to FIG. 2B, battery pack may include insulation layer 204. In this disclosure, an "insulation layer" is the layer of thermal insulation separating the layers of plurality of battery cells. Insulation layer will be compressed, so the material from which it is made up of must withstand the expected pressure from the compressed case; the case applies a pressure within a range of 2-5 pounds per square inch (PSI) (1.4-3.4 kPa) to the layers of insulation and layers of plurality of battery cells. For example, using the spring constant of the material as a metric of interest, the spring constant of the material should be non-negligible. In this disclosure, the spring constant is the force needed to stretch or press a spring. In some embodiments, the material may be aerogel since it is a good thermal insulator and has a non-negligible spring constant. Insulation layer 204 prevents heat from spreading from one cell to another. Without any insulation, if a battery cell fails and releases catastrophic amounts of heat, then the whole battery will fail and cause catastrophic damage to the aircraft. Insulation layer 204 may comprise an aerogel, fiberglass, fiberglass infused with aerogel, or any appropriate insulating material. The insulation shown in this embodiment is a compressible material. In some embodiments, aluminum fins are placed in between cells. The fins may provide thermal contact.

Still referring to FIG. 2B, battery pack may include cell layer 208. In this disclosure, "cell layer" is the layer of battery cells between each insulation layer. Plurality of battery cells are further explained in reference to FIG. 2A. Cell layer may comprise a liquid electrolyte. In some embodiments, the battery assembly system aligns the stacked layers of the battery and fits the stacked and aligned layers into the container. The components of the battery may be required to be compressed and tightly secured in the container.

Figure 3:
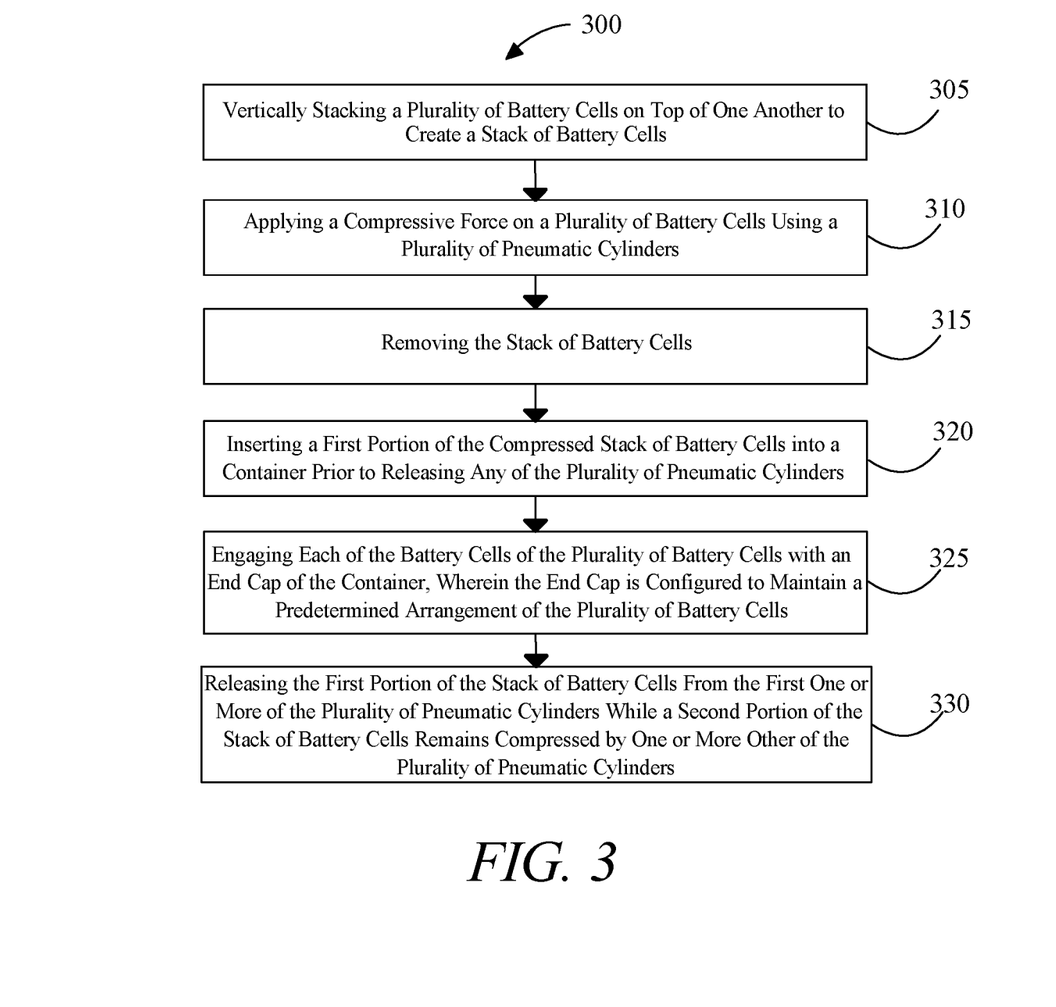
FIG. 3 is a flow diagram of an exemplary embodiment of a method for an aircraft motion observer in an electric aircraft.

Now referring to FIG. 3, an exemplary embodiment of method 300 for the manufacturing of a battery pack in an electric aircraft. The electric aircraft may include, but without limitation, any of the aircraft as disclosed herein and described above with reference to at least FIG. 1. The battery pack container is connected to an electrical system of an electric aircraft and provides power to at least a portion of aircraft 100.

Still referring to FIG. 3, at step 305, method 300 includes vertically stacking a plurality of battery cells on top of one another to create a stack of battery cells. Plurality of battery cells may be any battery cell as explained herein with reference to FIG. 2A. In this disclosure, "stacking" is the process of aligning the battery cells on top of one another so that when placed into the container, they are vertically stacked inside. The stack of plurality of battery cells may withstand pressure. The stack of battery cells is positioned relative to the container. Stacking includes maintaining the alignment of the plurality of battery cells using a stacking fixture. In this disclosure, a "stacking fixture" is a sort of device that keeps the stack of battery cells standing up straight. Stacking fixture comprises a frame or case based on the shape of the plurality of battery cells. Examples may include, without limitation, a rod or the like wherein the cross-sectional shape aligns with a hole in the middle of the battery cells, allowing them to send cape right on. Method 300 includes a compression mechanism that applies a compressive force to plurality of battery cells during the assembly of battery pack 200. For the purposes of this disclosure, "a compression mechanism" is a device that applies a compressive force to an object. For example, and without limitation, compression mechanism is used to compact battery cells. Stack of battery cells also includes insulation layer and conductors. In this disclosure, "insulation layer" is the layer of thermal insulation separating the layers of a plurality of battery cells. Insulation layer will be compressed, so the material from which it is made up of must withstand the expected pressure from the compressed case; the case applies a pressure within a range of 2-5 pounds per square inch (PSI) (1.4-3.4 kPa) to the layers of insulation and layers of plurality of battery cells. For example, using the spring constant of the material as a metric of interest, the spring constant of the material should be non-negligible. In this disclosure, the spring constant is the force needed to stretch or press a spring. In some embodiments, the material may be aerogel since it is a good thermal insulator and has a non-negligible spring constant. Insulation layer prevents heat from spreading from one cell to another. Without any insulation, if a battery cell fails and releases catastrophic amounts of heat, then the whole battery will fail and cause catastrophic damage to the aircraft. Also in this disclosure, "conductors" are materials that permit electricity to flow freely through it.

Still referring to FIG. 3, at step 310, method 300 includes applying a compressive force on a plurality of battery cells using a plurality of pneumatic cylinders. In this disclosure, a "compressive force" is the pressure that may be applied on opposing sides of plurality of battery cells. Such as, without limitation, compressive force may be applied to opposing sides of battery cells by applying pressure on a top layer of battery cells and on a bottom layer of battery cells to compress all the battery cells. For instance, without limitation, battery cells may be decreased in in cross-sectional area due to the size of battery cells are reduced along a vertical axis for insertion of battery cells into a container, as discussed further in this disclosure. Compressive force may be applied using a variety of techniques. For example, compression mechanism may be configured to use electrical power, pneumatic pressure, hydraulic pressure, magnetic forces, or any combinations thereof to apply compressive force to battery cells. Compression mechanism 108 may include a solenoid, servomotor, motor, electric motor, magnets, ratchet, screw, presse, weights, or the like. In this embodiment, the compressive force is being applied by the plurality of pneumatic cylinders. "Pneumatic cylinders", in this disclosure, are mechanical devices that use the power of compressed gas to produce the compressive force. The cylinders comprise a piston which is moved in the desired direction due to the compressed gases, which is usually just air. Plurality of pneumatic cylinders exert pressure on an additional external layer of the stack of battery cells, compressing the stack of battery cells. Pneumatic cylinders may allow plurality of battery cells to be inserted portion by portion into the container, wherein portions of plurality of battery cells that are not near the opening of the container remain compressed by the pneumatic cylinders. Pneumatic cylinders may be used to exert pressure on the top and bottom battery layers, compressing the cells of the battery. A plurality of pneumatic cylinders may press down on the top of the cell stack while a plurality of pneumatic cylinders exert pressure on the bottom of the cell stack.

Still referring to FIG. 3, at step 315, method 300 includes inserting a first portion of the compressed stack of battery cells into a container prior to releasing any of the plurality of pneumatic cylinders. In this disclosure, a "first portion" of the compressed stack of battery cells is a group of battery cells that is inserted into the container before any of the others. As this first portion is inserted into the container, the cells are not yet released from the compressive grip of the pneumatic cylinders. For example, container may be advanced up to stacked battery cells. Inserting at least a portion of the compressed stack of battery cells into a container includes advancing the stack of battery cells into the container up to a component comprising a first one or more of the plurality pneumatic cylinders. After advancing the container, pneumatic cylinders may release the first portion of the stacked battery cells, which is further explained below. Moreover, a cell cover comprising a low friction material is added to the stack of battery cells prior to inserting the stack of battery cells in the container. In this disclosure, a "cell cover" is a component that avoids inserting the cells into the container unevenly. Low friction cell covers may allow the battery cells to send cape easily into a can. Low friction cell covers may be placed as the first and final layers of the battery cell stack. The low friction cell covers may comprise a slippery material, such as a plastic, polytetrafluoroethylene, polyoxymethylene, Delrin, or any other appropriate material. Low friction cell cover may comprise insulating properties to prevent melting or fire. For example, the low friction cell cover may comprise a slick material with an insulating coating such as intumescent paint. Intumescent materials may provide energy absorption due to phase change. Intumescent paint or additives may be used. Cell cover comprising a low friction material is removed following insertion of the stack of battery cells in the container. Cell cover cell also compresses the stack of battery cells.

Still referring to FIG. 3, at step 320, method 300 includes engaging each of the battery cells of the plurality of battery cells with an end cap of the container. In this disclosure, an "end cap" is an end cap for the battery pack that encapsulates the stacked battery cells inside. End cap may comprise a nonconductive component configured to align back plate, sense board and internal battery components and hold their position. End cap may encapsulate a portion of a first end of battery pack 200 and comprise a second opposite and opposing end cap which encapsulates a portion of a second end of battery pack 200 and is further configured to align hereinabove described components. The container is sealed by the end cap after compression and after the stack of battery cells are fully inserted into the container; the stack of battery cells are released from the pneumatic cylinders prior to end cap being put into place. The nonconductive component of end cap may hold the plurality of battery cells in place inside the container since the cylinders are no longer holding them together. Container may include a second end cap that seals the container from the other end if not already sealed. End cap is explained further herein with reference to FIG. 4.

Still referring to FIG. 3, at step 325, method 300 includes releasing the first portion of the stack of battery cells from the first one or more of the plurality of pneumatic cylinders while a second portion of the stack of battery cells remains compressed by one or more other of the plurality of pneumatic cylinders. As the battery cells advance into the container, the nearest pneumatic cylinders are retracted. Other pneumatic cylinders may remain in position, compressing the battery cells, until the container is advanced to the pneumatic cylinders. Once it has fully advanced and the battery cells are fully inserted into the case, then that is when all the pneumatic cylinders will be released form the battery cells. Further portions of the stack of battery cells are inserted until the stack of battery cells are fully inserted into the container.

Still referring to FIG. 3, still at step 320, the end cap is configured to maintain a predetermined arrangement of the plurality of battery cells. For the purposes of this disclosure, a predetermined arrangement of battery cells refers to a specific desired assortment, such as orientation and quantity, of battery cells. A protective wrapping may also be used to maintain the predetermined arrangement of battery cells, as discussed further below. Though battery cells are shown as a single stacked column, as understood by one skilled in the art, a plurality of columns of stacked battery cells may be inserted and fitted into a container. In other embodiments, battery cells may be in a staggered arrangement. The staggered arrangement allows more battery cells to be disposed closer together than in square columns and rows like in a grid pattern. The staggered arrangement may also be configured to allow better thermodynamic dissipation. For example, battery cells may be stacked in layers where one battery cell sits atop of another, which in turn sits atop a desired number of intermediary battery cells until the bottom battery cell. As understood by one skilled in the art, battery cells may include any number of individual battery cells without changing the scope or spirit of the invention. End cap encapsulates the battery cells in their predetermined arrangement.

Figure 4:
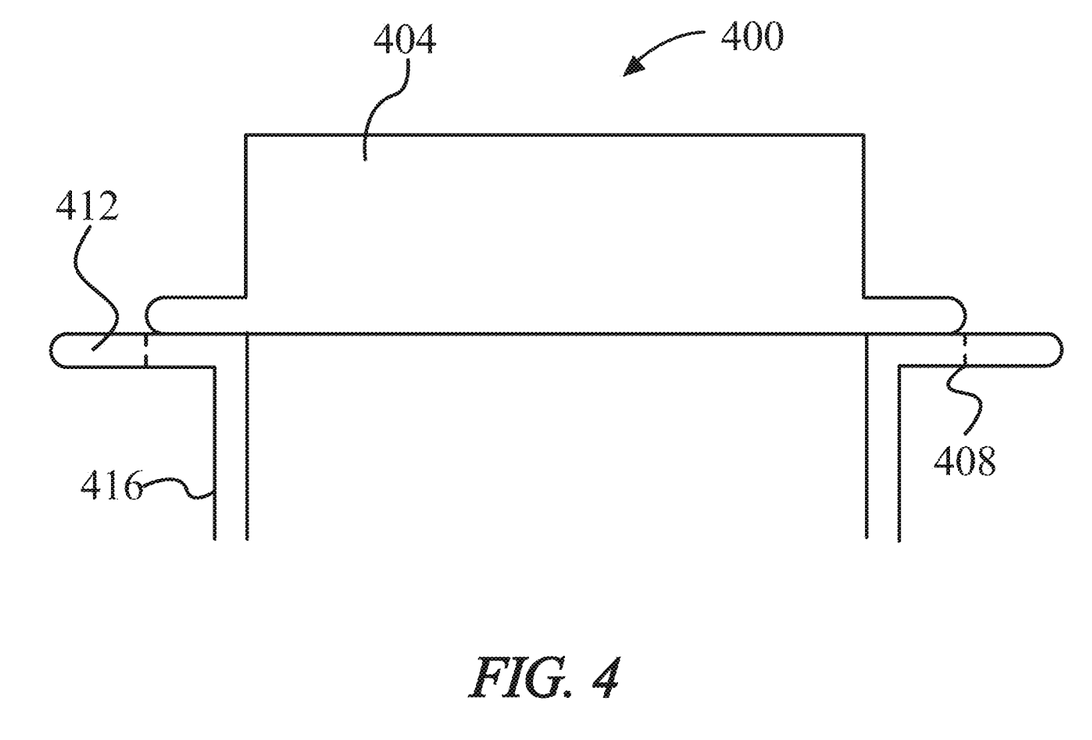
FIG. 4 is an exemplary embodiment of an end cap of a battery pack.

Now referring to FIG. 4, an exemplary embodiment of an end cap for the battery pack is illustrated. System 400 includes end cap 404, lip 408, flange 412, and exterior surface of the container 416.

Still referring to FIG. 4, system 500 includes end cap 404 that rests on top of lip 408. End cap 404 may comprise a snap attachment mechanism further comprising a protruding boss which is captured, at least in part by a receptacle of a corresponding size, by a receptacle disposed in or on the back plate. End cap may employ a similar or same method for coupling itself to a sense board, which may comprise a similar or the same receptacle. One of ordinary skill in the art would appreciate that this quick attach/detach mechanism end cap may comprise only an example and any number of mechanisms and methods may be used for this purpose. It should also be noted that other mechanical coupling mechanisms may be used that are not necessarily designed for quick removal. Said mechanical coupling may include, as a non-limiting example, rigid coupling (e.g. beam coupling), bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. End cap may comprise a nonconductive component manufactured from or by a process that renders it incapable or unsuitable for conveying electrical through, on, or over it. Nonconductive materials end cap may comprise paper, Teflon, glass, rubber, fiberglass, porcelain, ceramic, quartz, various plastics like HDPE, ABS, among others alone or in combination. End cap may comprise an electrical bus. Electrical bus, for the purposes of this disclosure and in electrical parlance is any common connection to which any number of loads, which may be connected in parallel, and share a relatively similar voltage may be electrically coupled. Electrical bus may refer to power busses, audio busses, video busses, computing address busses, and/or data busses. An electrical bus may be responsible for conveying electrical energy stored in a battery pack to at least a portion of an electric aircraft. The underside of the end cap may be made of the same material as the interior, while the rest may be made with the non-anodized material of the exterior surface. End cap 404 may be configured to cover the opening of the case where the flange may be configured to wrap around the end cap when it is covering the opening of the can, the flange is further described below. End cap 404 may be configured to leave no gap or space between itself, and the case, so no hot gasses or toxins escape that could possibly cause harm to the aircraft or its workers. End cap 404 is configured to rest on lip 408. In this disclosure, "lip" is an edge that projects out of the opening of the container wherein the lid of the case may rest on it without falling into the case. Lip 408 may include a longer side and a shorter side. Lip 408 may also include a flange on its longer side to attach the lid to the case. In this embodiment, a "flange" is a piece of the lip that serves to stabilize the lid to the case. There may be at least one lip 408 attached to the opening but there may be any amount; more lips mean more flanges to lock the lid into place. End cap 404 may not be usually placed on top of the case until the entirety of the of plurality of battery cells have been inserted into the container. In a nonlimiting example, the top side may be an end cap with electric terminals designed to connect the battery cells attached to the terminals. In another nonlimiting example, the terminals may include a sensor designed to monitor the status of the battery cells connected to the terminals.

Still referring to FIG. 4, system 500 includes lip 408 which includes flange 412. Flange 412 more securely fastens the end cap to the top of the case by wrapping around the end cap. It further helps prevent hot gasses or toxins from escaping through a gap between the end cap and the case. It is important to note that flange 412 may be located on the longer side of lip 408, which is usually weaker than the shorter side where hot gasses and toxins are more likely to escape. Since the longer side is weaker, flange 412 may be placed there to strengthen it. Flange 412 may not be needed on the shorter sides because gas and toxins are less likely to escape there. Flange 412 may also include any sort of fastener or adhesive, including but without limitation, glue, nails, bolts, screws, lap joint flanges, or the like. Flange 412 may be made with the same material as the exterior surface of the case. However, material must not be brittle enough as to where flange 412 may easily break off when it is being wrapped around end cap 404. To prevent flange 412 from breaking off, it may not be anodized. In some applications, the thickness of the anodization layer must be paid attention to, or this material may be too brittle or may not offer the desired electrical insulation.

What is claimed is:

1. A method for manufacturing a battery pack of an electric aircraft, the method comprising:
    vertically stacking a plurality of battery cells to create a stack of battery cells;
    applying a compressive force on the stack of battery cells using a plurality of pneumatic cylinders;
    applying a cell cover comprising a material with insulating properties to the stack of battery cells as a first and a last layer of the stack of battery cells, wherein the cell cover is configured to further compress the stack of battery cells to generate a compressed stack of battery cells, wherein the material is configured to thermally insulate the stack of battery cells;
    inserting a first portion of the compressed stack of battery cells into a container prior to releasing any of the plurality of pneumatic cylinders;
    engaging each battery cell of the plurality of battery cells with an end cap of the container, wherein the end cap is configured to:
        maintain a predetermined arrangement of the plurality of battery cells, wherein the end cap includes an electrical bus;
        couple to a back plate using a first snap attachment mechanism comprising a first protruding boss configured to be captured by a first receptable disposed on the back plate;
        couple to a sense board using a second snap attachment mechanism comprising a second protruding boss configured to be captured by a second receptable disposed on the sense board; and
        rest on top of a lip, wherein the lip comprises a flange located on a longer side of the lip, wherein the flange is configured to wrap around the end cap;
    releasing the first portion of the stack of battery cells from a first portion of the plurality of pneumatic cylinders while a second portion of the stack of battery cells remains compressed by one or more other pneumatic cylinders of the plurality of pneumatic cylinders; and
    connecting the container to an electrical system of a vehicle through the electrical bus of the end cap, wherein the electrical bus includes a sensor designed to monitor a status of at least one battery cell of the plurality of battery cells connected to the electrical bus.

2. The method of claim 1, wherein the stack of battery cells comprises an insulation layer between each battery cell and at least an adjacent battery cell.

3. The method of claim 1, wherein inserting a first portion of the compressed stack of battery cells into a container includes advancing the stack of battery cells into the container until the plurality of pneumatic cylinders attached to all battery cells stacked in the first portion are released.

4. The method of claim 1, wherein the second portion of the stack of battery cells is inserted into the container after the first portion of the stack of battery cells is released.

5. The method of claim 1, wherein the container is sealed with the end cap after the first portion and the second portion of the stack of battery cells are fully inserted into the container.

6. The method of claim 1, wherein the plurality of pneumatic cylinders exerts pressure on an additional external layer of the stack of battery cells, compressing the stack of battery cells.

7. The method of claim 6, wherein a low friction band is wrapped around the stack of battery cells, and the low friction band is parallel to a face of the additional external layer.

8. The method of claim 7, wherein the low friction band also compresses the stack of battery cells.

9. The method of claim 1, wherein alignment of the plurality of battery cells is maintained using a stacking fixture.

10. The method of claim 9, wherein the stacking fixture comprises a frame.

11. The method of claim 1, wherein the cell cover comprises a slick material coated in intumescent paint and is removed following insertion of the stack of battery cells in the container.

12. The method of claim 1, further comprising providing power to at least a portion of the vehicle.

13. The method of claim 1, wherein the end cap comprises a non-electrically conductive component.

14. The method of claim 1, wherein the container includes a second end cap that seals the container.

15. The method of claim 1, wherein the container comprises an electrical contact having an electrical connection with each battery cell of the plurality of battery cells.

16. The method of claim 1, wherein the method further comprises arranging the plurality of battery cells in a staggered configuration within the container.

\* \* \* \* \*